Aug. 10, 1937.                B. LIEBOWITZ                2,089,916
                    MANUFACTURE OF COLLARS AND THE LIKE
                    Filed March 24, 1934          7 Sheets-Sheet 1
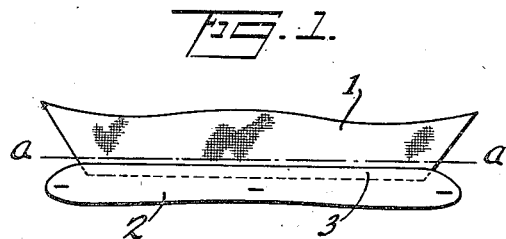
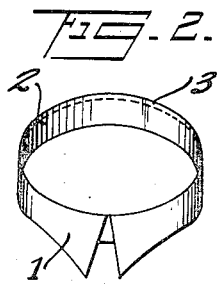
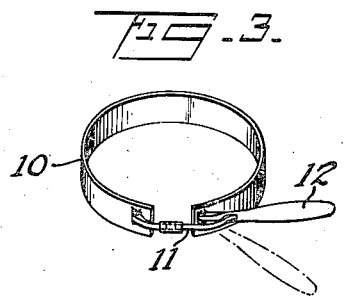
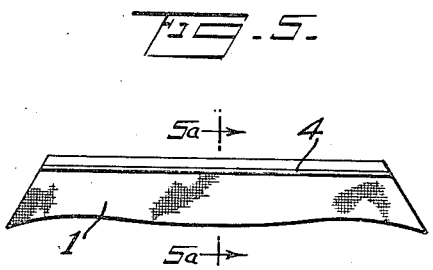
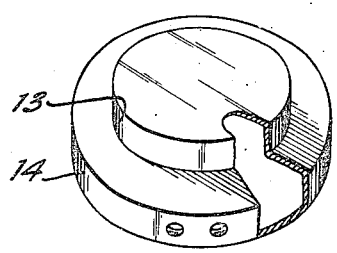
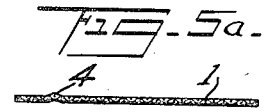
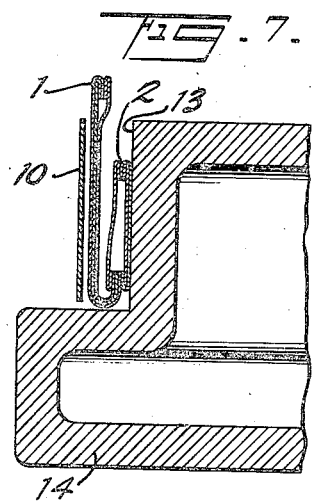
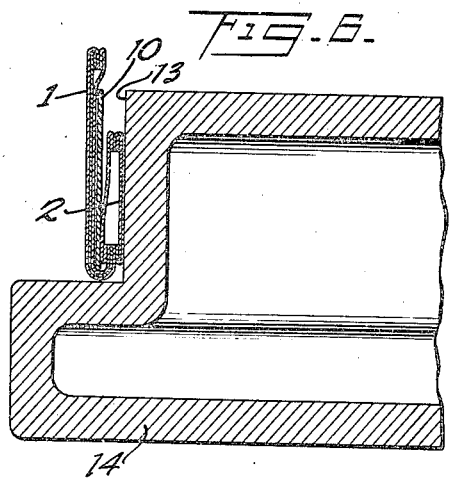
INVENTOR
Benjamin Liebowitz.
BY
ATTORNEY

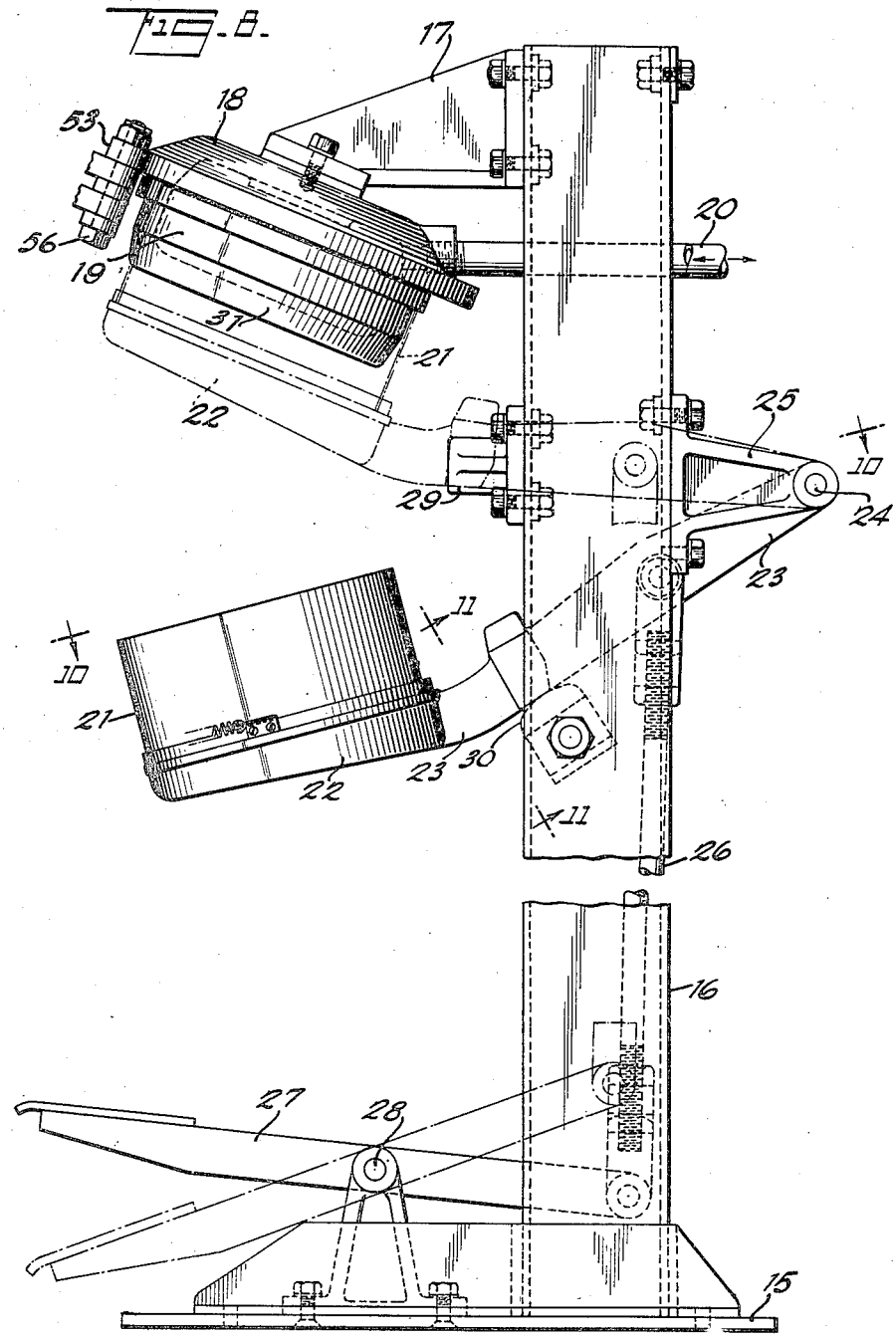

Aug. 10, 1937.   B. LIEBOWITZ   2,089,916
MANUFACTURE OF COLLARS AND THE LIKE
Filed March 24, 1934   7 Sheets-Sheet 3
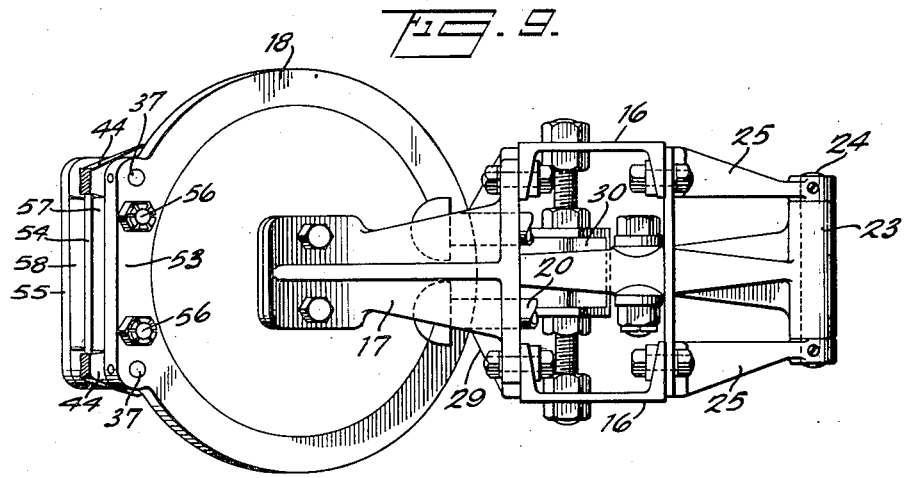
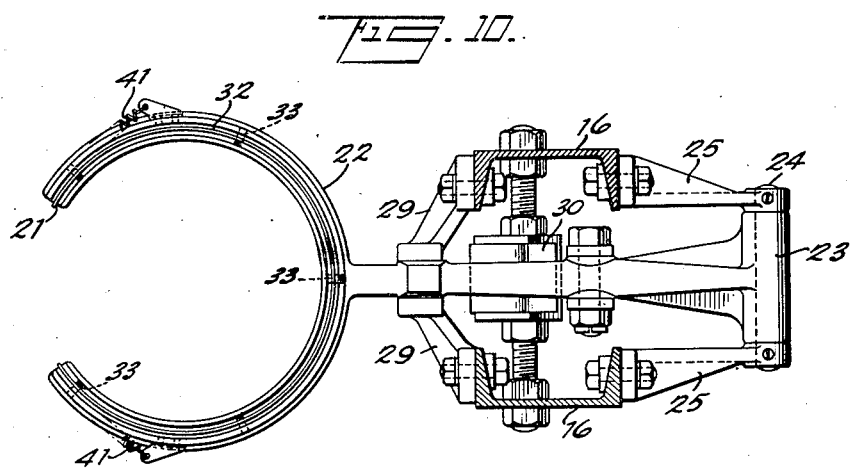
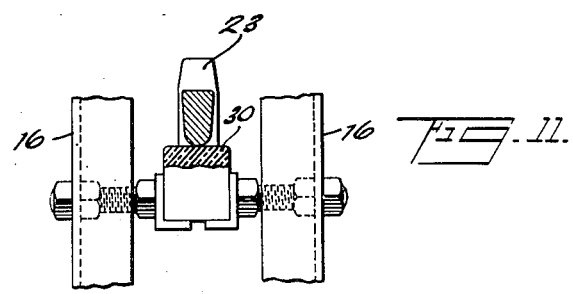
INVENTOR
*Benjamin Liebowitz.*
BY
ATTORNEY Aug. 10, 1937.    B. LIEBOWITZ    2,089,916
MANUFACTURE OF COLLARS AND THE LIKE
Filed March 24, 1934      7 Sheets-Sheet 4
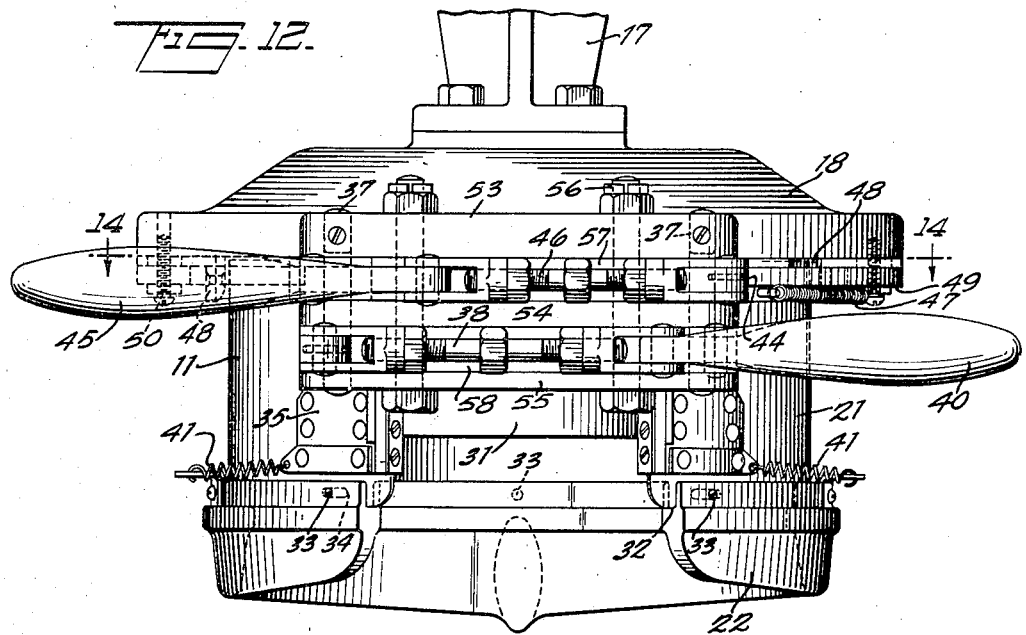
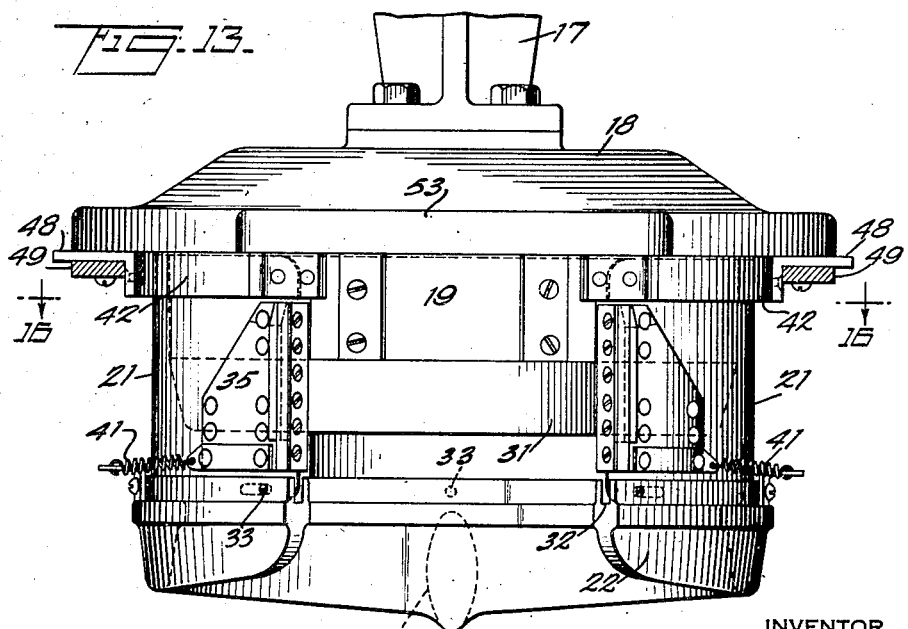
INVENTOR
Benjamin Liebowitz.
BY
Lester F. Dittenhöfer
ATTORNEY

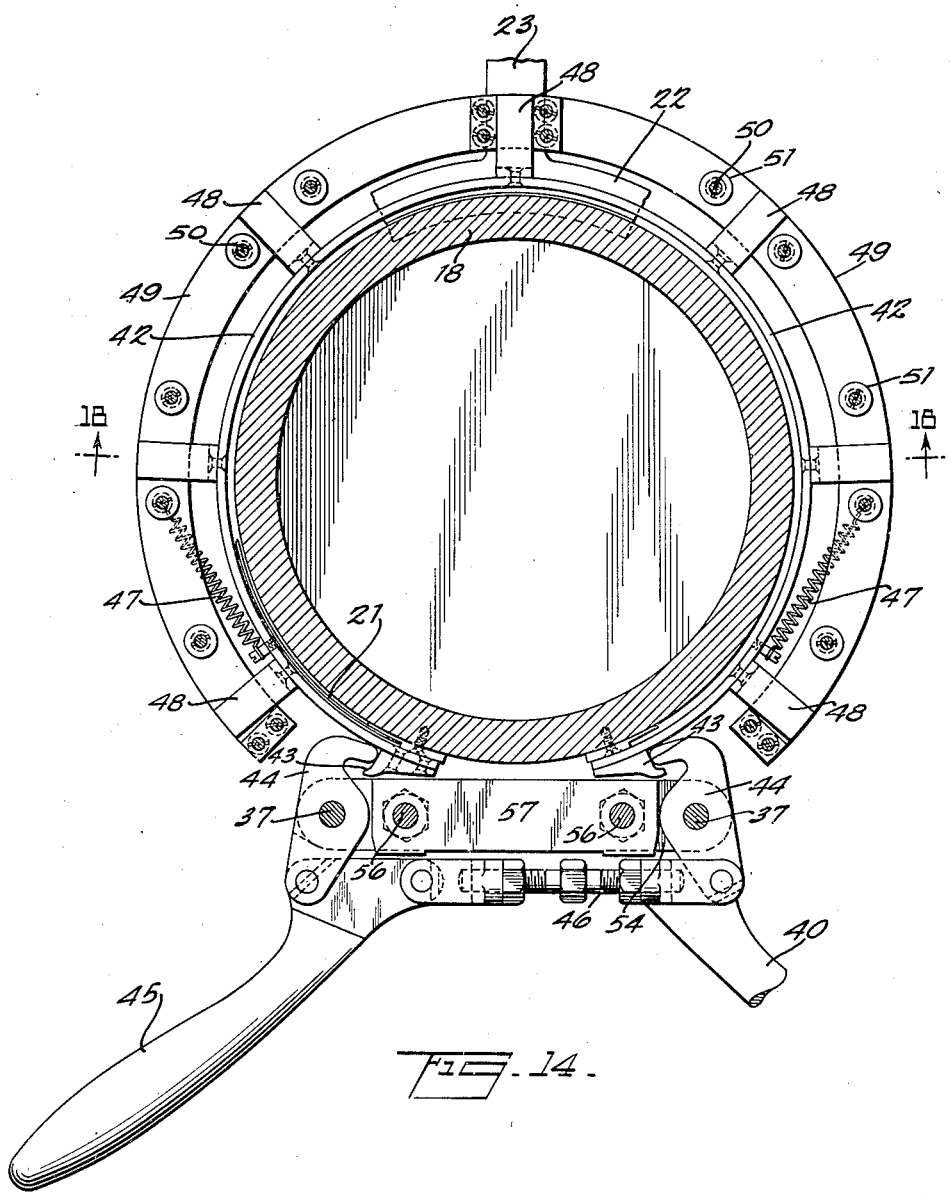

Aug. 10, 1937.     B. LIEBOWITZ     2,089,916
MANUFACTURE OF COLLARS AND THE LIKE
Filed March 24, 1934     7 Sheets-Sheet 6
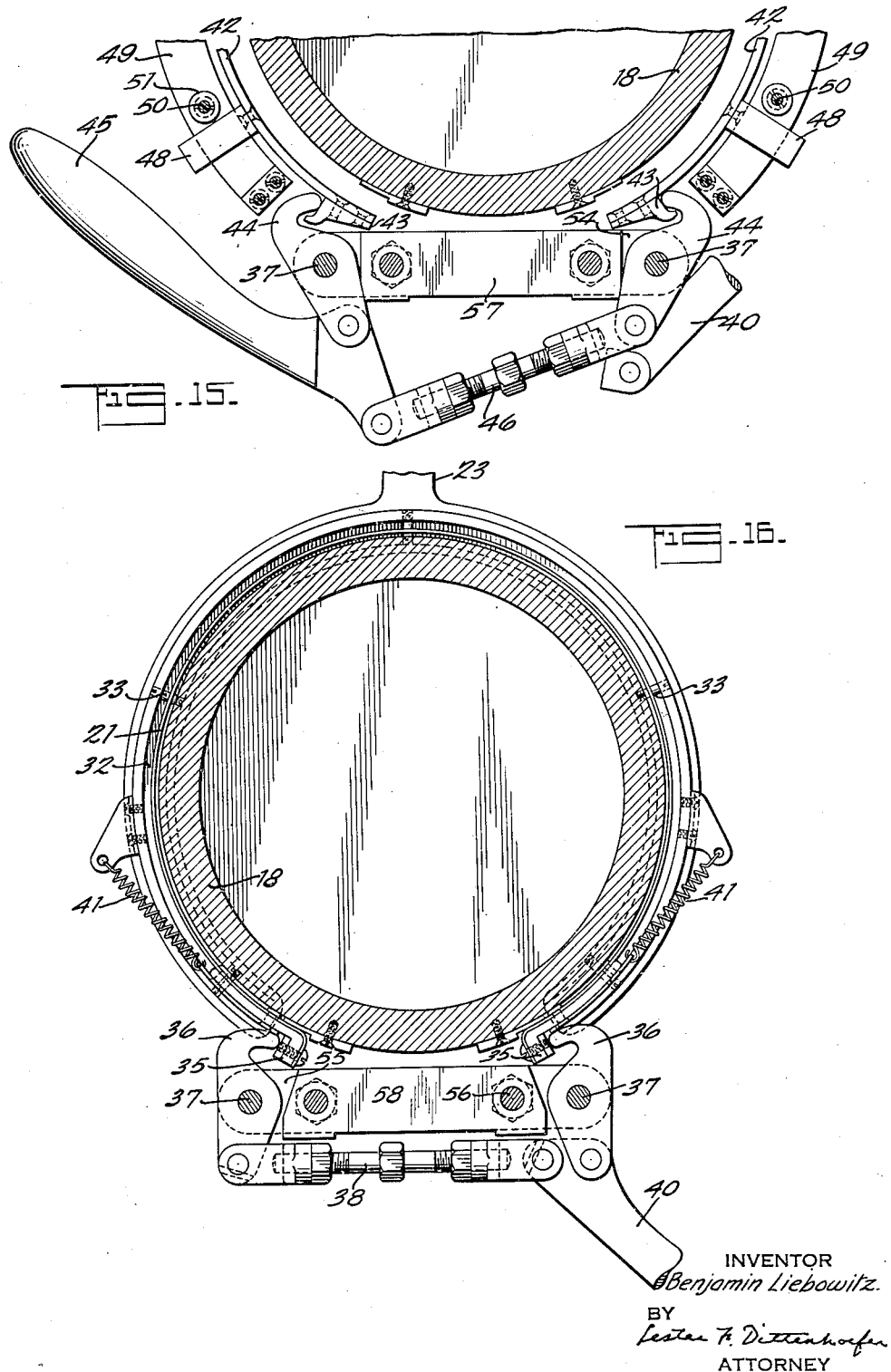
INVENTOR
Benjamin Liebowitz.
BY
Lester F. Dittenhoefer
ATTORNEY Aug. 10, 1937.                  B. LIEBOWITZ                    2,089,916
                    MANUFACTURE OF COLLARS AND THE LIKE
                        Filed March 24, 1934        7 Sheets-Sheet 7
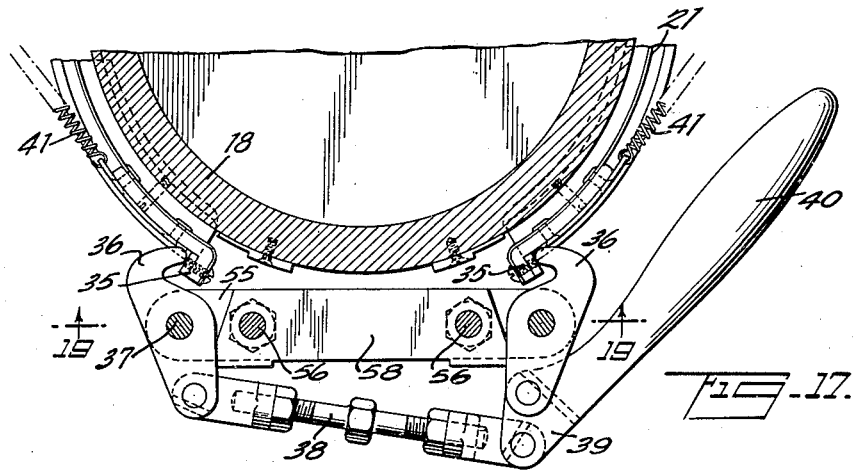
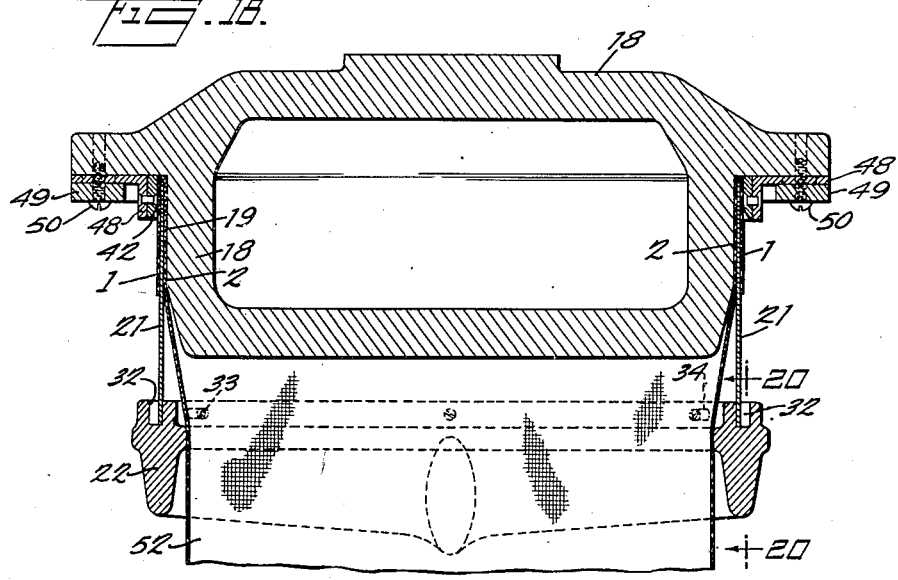
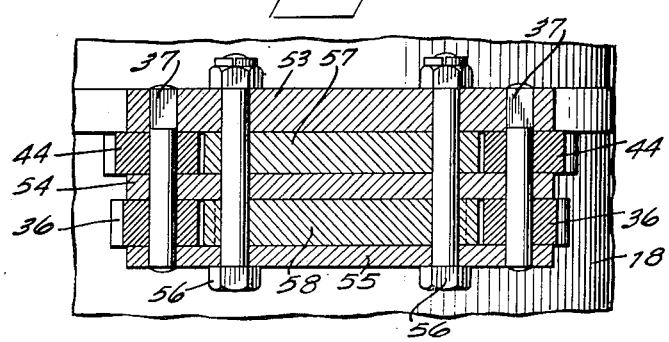
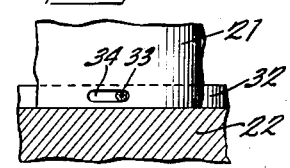
INVENTOR
Benjamin Liebowitz.
BY
Lester F. Dittenhofer
ATTORNEY Patented Aug. 10, 1937

2,089,916

UNITED STATES PATENT OFFICE 2,089,916

MANUFACTURE OF COLLARS AND THE LIKE

Benjamin Liebowitz, New York, N. Y., assignor to Trubenizing Process Corporation, New York, N. Y., a corporation of New York Application March 24, 1934, Serial No. 717,146

8 Claims. (Cl. 223—52.1)

This invention relates to the manufacture of collars and the like, and more particularly to the type of collar having the plies permanently united adhesively.

When the stitching operations and first pressing operation on a collar are completed, the collar, which we assume to be of the conventional turned-down type, is in a flat, unfolded state. Before it can be worn, it must be turned down and then bent round to conform to the shape of the neck. Moreover, these operations must be performed again each time the collar is laundered. In the case of conventional soft collars these operations involve no difficulty; in fact, such collars are usually shipped in a flat-pressed condition. But where the collar has "body", the deformations involved first in turning down and second in "shaping" the collar cause difficulties; the nature of which can be understood by considering the difference between the inside radius of the band portion and the outside radius of the collar-top portion adjoining the fold line, after the collar has been folded down and bent into circular shape.

In the prior art relating to collars which are endowed with "body" by adhesively uniting the plies, there are several disclosures of means to overcome or minimize this difficulty by omitting the adhesive binding in a narrow zone whereby a non-stiffened fold-line is obtained. In attempting to apply this idea of a non-stiffened fold-line to my method of adhesively uniting the plies, however, I have found it to be practically impossible to maintain sufficiently accurate alignment and spacing between the collar-banding seam, on the one hand, and the line of demarcation between the stiffened and unstiffened portions of the collar-top, on the other hand. Moreover, I have found that said line of demarcation between stiffened and unstiffened portions acts as a focal line from which ply separation tends to spread, upon repeated launderings, into the adhesively united portions. In short, I have not been able to manufacture commercially satisfactory collars embodying the unstiffened fold-line. On the other hand, if the zone of the fold-line is stiffened uniformly with the rest of the collar-top, then special means must be provided to form a "natural" fold-line and to produce a "shaped" collar, otherwise, when the collar is turned down and bent into approximately circular shape, it will assume a form like an irregular polygon instead of a smooth continuous curve.

One of the primary objects of this invention is to provide a fold-line along which the collar will be turned down smoothly when first made, and along which the collar will tend to fold naturally and definitely after subsequent washings. Another object is to shape or mold the collar to conform to the neck in a smooth continuous curve, and in such a manner that the collar will tend to return to its initially molded shape after each washing. A further object is to provide a natural fold without incurring the fabricating difficulties involved in the use of an unstiffened zone and without weakening the fabric along said fold-line. A still further object is to provide method and means for accomplishing these results in a simple, effective manner and at small cost.

Other objects and advantages of the invention will appear from the following description thereof.

In the drawings:—

Figure 1 is a view of a turned-down collar in the flat open state;

Fig. 2 is a view in perspective of a collar after it has been turned down and molded to shape;

Figs. 3 and 4 are perspective views of the two fundamental elements of a mechanism for molding a collar;

Fig. 5 is a plan view of a collar-top in which a fold-line has been formed in a preliminary way;

Fig. 5a is a cross-section on the line 5a—5a of Fig. 5;

Fig. 6 is a section showing the first molding operation by means of the elements illustrated in Figs. 3 and 4;

Fig. 7 is a section showing the second molding operation by means of the same elements;

Fig. 8 is a side elevation of a molding machine embodying these elements;

Fig. 9 is a top plan view of the machine;

Fig. 10 is a section on the line 10—10 of Fig. 8;

Fig. 11 is a section on the line 11—11 of Fig. 8;

Fig. 12 is a front elevation of the head of the machine showing the operating handles and clamping mechanism;

Fig. 13 is a similar view but with the clamping mechanism removed;

Fig. 14 is a section on the line 14—14 of Fig. 12, showing the outer ring and clamping mechanism in closed position;

Fig. 15 is a fragmentary view, same as Fig. 14, but in the open position;

Fig. 16 is a section on the line 16—16 of Fig. 13, showing the inner ring in closed position;

Fig. 17 is a fragmentary view corresponding to Fig. 16, but in the open position;

Fig. 18 is a section on the line 18—18 of Fig. 14, showing a collar being molded in the machine;

Fig. 19 is a section on the line 19—19 of Fig. 17, showing how the clamping mechanisms are mounted on the head of the machine; and, Fig. 20 is a fragmentary detailed sectional view on the line 20—20 of Fig. 18.

Referring to the drawings, Figure 1 represents a collar, which may or may not be permanently attached to a shirt, comprising a collar top 1 and collar band 2, the collar top 1 having a region 3 which extends into the band, according to the usual practice in collar making. The collar top is intended to be folded down along the line a—a, and, after it has been folded down and properly shaped, the collar has the appearance indicated in Fig. 2. The collar top 1 is preferably made according to the method described in my Patents Nos. 1,968,409 and 1,968,410 both of July 31, 1934, wherein the plies of the collar are permanently united adhesively by means of cellulose acetate yarn interwoven with the lining. While this description refers primarily to the case where the collar top 1 and not the band 2 are thus treated, nevertheless it will be understood that the method herein described is also applicable to the case when the band 2 is also treated, or where the collar top and band are made as one part instead of separate parts.

To facilitate the turning down operation, I may form the fold-line in a preliminary way by passing the collar top through rollers so as to score it along the line 4 as indicated in Figs. 5 and 5a. This preliminary scoring, which is sometimes helpful, it not essential.

The method of molding here described consists essentially of (1) moistening the region 3 of the collar top with a solvent of the adhesive material, as, for example, acetone or a mixture of acetone and alcohol or water, or any other suitable solvent; (2) allowing the solvent to remain in the collar sufficiently long to soften the region 3 and to creep toward the fold-line a—a of Fig. 1 and soften that region also; (3) turning down the collar top along the line a—a or 4, and slipping the collar over a band so that said band lies between the collar top and collar band and thereby protects the adhesive of the collar top from being affected by the solvent; and, (4) in applying pressure and heat to mold the collar.

A simple apparatus for carrying out this method is illustrated in Figs. 3, 4, 6 and 7 wherein 10 indicates a clamping band having a toggle 11 and handle 12 whereby the band may be contracted. 13 is the annular shaping surface of a heated former 14. The band 10 is inserted between the collar parts, and the collar, with the band in place, is positioned around the surface 13. The band 10 is then contracted to press the collar band 2 tightly against said heated surface, as shown in Fig. 6. At the end of this operation the collar top may have a slight bulge near the fold line, which bulge may be removed by pressing the entire collar between the band 10 and surface 13, as indicated in Fig. 7.

Collars, made by this method, have the necessary smooth finished appearance when new, and have a permanent "set" so that they will fold down naturally along the fold line and return substantially to their initial molded shape, after repeated launderings. It is obvious that the effects of this molding operation will tend to be permanent, that is, they will tend to survive repeated launderings, because the molding is done while those regions of the collar wherein the adhesive material that unites the plies is in a softened condition due to the action of the solvent. Since, however, the adhesive material is substantially insoluble in water and the ordinary washing reagents, the initial form and shape thus given by the molding operation tends to persist. This has been verified by repeated tests.

For efficient production of collars on a commercial scale, it is desirable to incorporate the elements heretofore described in a suitable machine, which we shall now describe.

Referring now to Figs. 8 to 20, inclusive, 15 is a base on which is fastened the two steel channels 16 which, together with base 15 comprise the frame of the machine. By means of bracket 17, the head 18 is fastened, the head having an annular surface 19, corresponding to the surface 13 in Fig. 4. The head 18 is heated by means of steam which enters and leaves through pipes 20. A wide band 21, corresponding to the band 10 in Fig. 3, is carried on the forked end 22 of the lever 23, which in turn is pivotally connected at 24 to brackets 25 mounted on the frame. The band 21 is brought into engagement with the annular surface 19 by raising lever 23 by means of connecting link 26 which is operated by pedal 27 pivotally supported on the bracket 28. The brackets 29 serve as additional guiding means which are operative when ring 21 engages head 18. The lower position of lever 23 is determined by the rubber stop 30 which may be mounted in any convenient manner.

To facilitate smooth engagement of the band 21 with the annular surface 19, said annulus is provided with a tapered extension 31.

The band 21 rests in a groove 32 in the forked end 22 and is retained by means of pins 33 operating in slots 34 (see Fig. 20), which slots allow the band to expand and contract. The band 21 is left open as shown in the drawings, so that it may be contracted onto the head. Furthermore, the opening is made rather large to facilitate putting collars into the machine with shirts attached. The ends of the band are provided with lugs 35 securely fastened thereto. When the band 21 is brought into engagement with the surface 19, the lugs 35 engage the noses on the two short levers 36 which are normally in the open position shown in Fig. 17. The levers 36 are pivotally mounted on the head by means of pins 37. Through these levers the band is contracted about the surface 19 by means of the toggle mechanism comprising the adjustable link 38 and the end 39 of the handle 40 by means of which the mechanism is operated. By suitably adjusting the link 38, large forces may be exerted by means of this toggle mechanism. To assist in restoring band 21 to its open position, springs 41 may be provided.

In Fig. 7, I have shown how a supplementary pressing operation may be given to eliminate any bulging tendency which may arise as a result of the first molding operation. To accomplish this same result in the machine being described, I provide a second band 42, preferably much narrower and thicker than the band 21, and disposed outside the band 21 in such a manner that when the latter is brought into operating position, the collar top 1 will lie between the two bands 21 and 42. The band 42 has lugs 43 at its ends, which lugs are engaged by the free ends of the levers 44 when it is desired to contract the band. The levers are mounted on the pivot pins 37 and are operated by a toggle mechanism comprising the handle 45 and the adjustable link 46, in the same manner as the band 21 is operated. Springs 47 may be provided to assist in restoring the band 42 to its open position on release of the toggle mechanism. To support band 42, it is provided with the angle-pieces 48 which rest on the flat ring 49, which in turn is fastened to the head by the screws 50 and appropriately spaced therefrom by the buttons or spacers 51.

The relative position of the bands 21 and 42, the collar top 1, collar band 2 and annular surface 19 are clearly shown in section in Fig. 18, when the collar is being molded. In this figure the collar is shown attached to a shirt 52.

In order to support the toggle mechanisms in their proper positions on the head 18, said head is formed with an extension 53 to which the bars 54, 55, that hold the pivot pins 37, are fastened by means of bolts 56. The bars 54, 55 are maintained at their proper distances by the spacer blocks 57 and 58 as best seen in Fig. 19.

For the sake of clarity, band 21 is not shown in Fig. 15, and only a fragment of said band is shown in Fig. 14. Similarly, in other figures, parts are omitted to illustrate more clearly other parts being described.

The collar molding operation by means of this machine is substantially the same as previously described. The region 3 of the collar is moistened with solvent, thereby softening the region 3 and also the zone of the fold line; the collar top is then folded down along the fold line; the collar is then put over the band 21 which is in its lowest position; by pressing on the pedal 27, the lever 23 is raised, thereby bringing the band 21 into engagement with the annular surface 19. Up to this point the band 21 and band 42 must be in their open or nonclamping position; the handle 40 is now operated, thereby expanding the toggle mechanism and contracting the band 21 firmly against the collar band 2 which is thereby pressed solidly against the surface 19. Similarly, by operating the handle 47, the band 42 is contracted against the collar top by means of the corresponding toggle and levers. After say ten to twenty seconds, the solvent is driven off by the heated head; the handles 40 and 47 are then pushed to their open positions, whereby the lever 23 falls to its lowest position carrying band 21 and the collar with it, and the collar is released from the machine.

When the collar is turned down and bent into circular shape, prior to placing in the machine, it does not lie in a smooth curve but assumes the shape of an irregular polygon. When it is first placed in the machine, the band and that portion of the collar which extends into the band are puckered. This puckering is due to the ordinary laws of bending by virtue of which the parts bent into a smaller radius must be shortened relative to the parts bent into a larger radius. In this particular case, the difference in the two radii is represented by the total thickness of the collar at the fold line and corresponding to this difference in radii, which may be of the order of one-sixteenth of an inch, the relative change of lengths involved may be of the order of three-eighths of an inch. The outer parts stretch to some extent and the inner parts crumple, giving rise to the puckers mentioned above. But, when the collar is put into the machine, it will be recalled that the adhesive material which unites the plies in the region of the fold has been softened by the application of solvent. While those regions of the collar which are involved in this distortion are in this soft, puckered state, the machine brings to bear a pressure on said puckered surfaces normal to said puckered surfaces. In this way, the puckers are pressed flat and smooth, and, after the solvent has been driven off and the adhesive material once more solidified, the shape which has been given to the collar by the molding process remains permanent. This is because the adhesive material insures that the flattened, smoothed-out puckers will be permanent, that is, they will remain permanently flat and smoothed out, being held in such condition by the adhesive.

While I have described the invention particularly in the relation to the manufacture of turned down collars, it is equally applicable to shaping and molding other folded garment parts, such, for example, as a folded cuff of the kind commonly known as a "French cuff".

It is to be understood that modifications in the details of construction, arrangement of parts, and method of application herein described may be made without departing from the spirit or scope of this invention.

By the term "inner portion of the folded collar top", as used in the claims, is meant that portion of the folded collar top which extends into the collar band.

What I claim is:

1. A method of molding a fold-over collar, cuff or like article, having an outer part formed of plies of fabric united with an adhesive that is resistant to laundering agents, said outer part being folded along a predetermined fold line, and having an inner part, which comprises moistening the article in a region adjacent to the predetermined fold with a solvent for the adhesive, folding the parts along said fold line, placing a guard between the folded parts to protect them from being affected by the solvent except in the region of fold, and applying pressure to mold the article smoothly to curved shape and heat to evaporate the solvent.

2. A method of molding a fold-over collar, cuff or like article, having an outer part formed of plies of fabric united with an adhesive that is resistant to laundering agents, said outer part being folded along a predetermined fold line, and having an inner part, which comprises moistening the article in a region adjacent to the predetermined fold with a solvent for the adhesive, folding the parts along said fold line, placing a guard between the folded parts to protect them from being affected by the solvent except in the region of fold, and applying pressure against the inner part and the inner portion of the folded region of the outer part to mold the article smoothly to curved shape and heat to evaporate the solvent.

3. A method of molding a fold-over collar, cuff or like article, having an outer part formed of plies of fabric united with an adhesive that is resistant to laundering agents, said outer part being folded along a predetermined fold line, and having an inner part, which comprises moistening the article in a region adjacent to the predetermined fold with a solvent for the adhesive, folding the parts along said fold line, placing a guard between the folded parts to protect them from being affected by the solvent except in the region of the fold, applying pressure against the inner part and the inner portion of the folded region of the outer part to mold the article smoothly to curved shape, and heat to evaporate the solvent, and applying pressure around the outer part.

4. A method of molding a fold-over collar, cuff or like article, having an outer part formed of plies of fabric united with an adhesive that is resistant to laundering agents, said outer part being folded along a predetermined fold line, and having an inner part, which comprises moistening the article in a region adjacent to the predetermined fold with a solvent for the adhesive, folding the parts along said fold line, placing a contractible band between the folded parts, positioning the folded article with the band in place therein against a heated annular surface, and contracting the band to apply pressure against the inner part and the inner portion of the folded region of the outer part of the article while the latter is positioned on said heated annular surface, whereby to mold the article smoothly to curved shape.

5. A method of molding a fold-over collar, cuff or like article, having an outer part formed of plies of fabric united with an adhesive that is resistant to laundering agents, said outer part being folded along a predetermined fold line, and having an inner part, which comprises moistening the article in a region adjacent to the predetermined fold with a solvent for the adhesive, folding the parts along said fold line, placing a contractible band between the folded parts, positioning the folded article with the band in place therein against a heated annular surface, placing a second contractible band around the outer part of the article, and contracting both bands while the article is positioned on the heated annular surface to apply pressure to the article whereby to mold it smoothly to curved shape.

6. A method of molding a fold-over collar having a collar band and having a collar top formed of plies of fabric united with an adhesive that is resistant to laundering agents, which comprises treating the collar top in a region adjacent to the fold with a substance that temporarily softens the adhesive, folding the collar top over the collar band, and applying an encircling pressure transversely against the inner portion of the folded collar top to mold said portion smoothly to curved shape while the adhesive is in temporarily softened condition.

7. Apparatus for molding fold-over collars, or like articles to smoothly curved shape, comprising a frame, a heated former having an annular surface mounted on the frame, a contractible band adapted to be contracted about said surface, said band being mounted on an arm pivoted to the frame, a second contractible band mounted on the frame in position to surround the first mentioned band when the latter is brought into its operative position, means for moving the first mentioned band into operative relation with said heated former, and means for contracting both bands.

8. Apparatus for molding fold-over collars, or like articles to smoothly curved shape, comprising a frame, a heated former having an annular surface mounted on the frame, a split band adapted to be contracted about said surface, said band being mounted on an arm pivoted to the frame, a second split band mounted on the frame in position to surround the first mentioned band when the latter is brought into its operative position, means for moving the first mentioned band into operative relation with said heated former, and means mounted on the frame for engaging the ends of said split bands in the operative position and for contracting the first mentioned band around the annular surface of the heated former and contracting the second band around the first.

BENJAMIN LIEBOWITZ.